(12) United States Patent
Schmidt

(10) Patent No.: US 7,331,690 B2
(45) Date of Patent: Feb. 19, 2008

(54) INFRARED HEADLIGHT

(75) Inventor: Hans Joachim Schmidt, Ingolstadt (DE)

(73) Assignee: Patent-Treuhand-Gesellschaft fur electrische Gluhlampen mbH, Munich (DE)

(*) Notice: Subject to any disclaimer, the term of this patent is extended or adjusted under 35 U.S.C. 154(b) by 183 days.

(21) Appl. No.: 11/205,003

(22) Filed: Aug. 17, 2005

(65) Prior Publication Data

US 2006/0050523 A1   Mar. 9, 2006

(30) Foreign Application Priority Data

Sep. 3, 2004  (DE) .................. 10 2004 043 176

(51) Int. Cl.
  F21V 9/00  (2006.01)
  H01K 1/02  (2006.01)
  H01K 1/26  (2006.01)

(52) U.S. Cl. .............. 362/293; 362/509; 362/510; 313/17; 313/112; 313/113

(58) Field of Classification Search ........ 362/293, 362/507, 509, 510, 259; 313/17, 489, 580, 313/112, 113, 114, 115
See application file for complete search history.

(56) References Cited

U.S. PATENT DOCUMENTS

| | | | | |
|---|---|---|---|---|
| 285,784 A * | 10/1883 | Bartlett | .................. | 313/483 |
| 1,695,464 A * | 12/1928 | McCurdy et al. | .......... | 313/112 |
| 1,858,712 A * | 5/1932 | Louttit | .................. | 174/50.51 |
| 1,860,035 A * | 5/1932 | Kowvallis | .................. | 313/114 |
| 2,188,298 A * | 1/1940 | Hitchcock | .................. | 313/26 |
| 3,479,548 A * | 11/1969 | Schlessel | .................. | 313/113 |
| 4,017,758 A * | 4/1977 | Almer et al. | ............... | 313/112 |
| 4,042,818 A * | 8/1977 | Green | ........................ | 362/247 |
| 4,047,020 A * | 9/1977 | Noren | ........................ | 362/290 |
| 4,160,929 A * | 7/1979 | Thorington et al. | ........ | 313/112 |
| 4,338,540 A * | 7/1982 | Sovilla | ....................... | 313/579 |
| 4,346,323 A * | 8/1982 | Hirschfeld | .................. | 313/111 |
| 4,536,831 A * | 8/1985 | English et al. | .............. | 362/263 |
| 4,604,680 A * | 8/1986 | Levin et al. | ................. | 362/293 |
| 4,695,930 A * | 9/1987 | Wierzbicki et al. | ......... | 362/293 |
| 5,143,445 A * | 9/1992 | Bateman et al. | ............ | 362/293 |
| 5,177,396 A * | 1/1993 | Gielen et al. | ............... | 313/113 |
| 5,253,153 A * | 10/1993 | Mathews et al. | ........... | 362/310 |
| 5,359,255 A * | 10/1994 | Kawai et al. | ................. | 313/17 |
| 5,388,034 A * | 2/1995 | Allen et al. | ................. | 362/459 |
| 5,504,666 A * | 4/1996 | Carmichael | ................. | 362/294 |
| 5,587,626 A * | 12/1996 | Parham et al. | ............. | 313/634 |
| 5,811,934 A * | 9/1998 | Bunk et al. | ................. | 313/579 |

(Continued)

FOREIGN PATENT DOCUMENTS

DE      3932216      4/1991

(Continued)

Primary Examiner—Jong-Suk (James) Lee
Assistant Examiner—Edmund C Kang
(74) Attorney, Agent, or Firm—William E. Meyer

(57) ABSTRACT

An infrared headlight useful in a night vision system may be made with an infrared emitter positioned in a reflector. The radiation source is associated with a filter body which has a first filter layer part and a second uncoated part. The two parts are designed so the radiation transmitted through the uncoated part strikes a different area of the reflector than the infrared radiation transmitted through the filter layer. The two regions of the reflector may have differing reflective characteristics.

20 Claims, 3 Drawing Sheets

U.S. PATENT DOCUMENTS

| | | | | |
|---|---|---|---|---|
| 6,111,344 | A * | 8/2000 | Binder et al. | 313/113 |
| 6,212,004 | B1 * | 4/2001 | Stachowiak et al. | 359/360 |
| 6,601,980 | B2 * | 8/2003 | Kobayashi et al. | 362/510 |
| 6,670,763 | B2 * | 12/2003 | Golz et al. | 315/56 |
| 6,819,049 | B1 * | 11/2004 | Bohmer et al. | 313/635 |
| 2001/0019482 | A1 * | 9/2001 | Kobayashi et al. | 362/510 |
| 2001/0050344 | A1 * | 12/2001 | Albou | 250/504 R |
| 2002/0154513 | A1 * | 10/2002 | Yagi et al. | 362/510 |
| 2002/0154514 | A1 * | 10/2002 | Yagi et al. | 362/510 |
| 2002/0154515 | A1 * | 10/2002 | Yagi et al. | 362/510 |
| 2003/0007363 | A1 * | 1/2003 | Yagi | 362/510 |
| 2003/0076688 | A1 * | 4/2003 | Kobayashi | 362/510 |
| 2004/0232836 | A1 * | 11/2004 | Hashimoto et al. | 313/573 |

FOREIGN PATENT DOCUMENTS

| | | |
|---|---|---|
| EP | 1 072 841 | 1/2001 |
| GB | 2070222 A * | 9/1981 |
| WO | WO 2004053925 A2 * | 6/2004 |

* cited by examiner

INFRARED HEADLIGHT

TECHNICAL FIELD

The invention relates to an infrared headlight having an infrared emitter which is arranged in a reflector and has a radiation source which is held in an internal area of a lamp vessel, and having a filter which is permeable for radiation in the infrared range and reflects radiation at another wavelength, and which is arranged on a filter body which surrounds the lamp vessel at least in places. In addition, the invention relates to an infrared emitter which is provided for an infrared headlight such as this, as well as to a night-vision system with an infrared headlight such as this.

BACKGROUND ART

Infrared headlights such as these are used, for example, as illuminators for night-vision systems, which will also be intended in the future for use in motor vehicles.

EP 1 072 841 A2 discloses an infrared headlight in which an incandescent lamp is used as the infrared radiation source, whose incandescent filament emits both infrared radiation and light in the visible range during operation. In the known solution, the infrared headlight has a parabolic reflector, which deflects the infrared radiation to the desired direction and transmits the visible radiation. The reflector opening is covered by a filter disk, and the lamp vessel (which surrounds the incandescent filament) of the infrared emitter is provided with a light-reflective coating in a dome area. The filter disk, which is opaque to light in the visible range, represents a planar filter which may be designed either on the basis of the absorption principle or on the basis of the interference principle. A solution such as this has the following disadvantages: infrared planar filters based on the absorption principle are not suitable for temperatures above 250° C., and in some cases also contain cadmium. For these reasons, planar filters such as these are not suitable for automotive applications. Infrared planar filters based on the interference principle are suitable only for a very limited aperture of the headlight because the filter edge is shifted towards shorter wavelengths by the incidence angles (which increase towards the edge) of the radiation emitted from the infrared emitter and this can result, for example, in disturbing red light. In practice this means that it is not possible to cover the entire outlet area of a conventional headlight with the filter, in order to avoid residual red light, and, instead, an annular area must be left free on the outside, through which white light is emitted.

DE 39 32 216 A1 discloses an illumination device for automotive applications, which can be used both as an infrared headlight and as a main beam. The illumination device has a reflector in which a light source is inserted. Furthermore, a filter is also inserted in the reflector, through which infrared radiation can pass and which reflects radiation in the visible range towards the light source. In the main beam mode, the filter is moved with respect to the light source such that it is ineffective, so that all of the radiation is reflected via the reflector towards the reflector opening. When dipped lights are selected, the filter is moved over the light source such that the illumination device emits only infrared radiation.

The disadvantage of a solution such as this is that the cylindrical filter which is moved over the illumination device can result in thermal problems, so that the lamp is either too small for the main beam mode, or becomes too hot in the infrared mode. Furthermore, it has been found that, even with this illumination device, disturbing red light is created as a result of high incidence angles on the cylindrical interference filter. A complex mechanism is required to move the filter. The installation depth of the headlight is considerably increased, because the entire filter must be located in front of the lamp in the main beam mode. A slot is required in the reflector, which reduces the effective reflector area and thus the efficiency of the arrangement.

DISCLOSURE OF THE INVENTION

The invention is based on the object of providing an infrared headlight and an infrared emitter which is suitable for it, in which the infrared emission is improved.

According to the invention, this object is achieved with regard to the infrared headlight by the features of patent claim 1, and with regard to the infrared emitter by the features of patent claim 17. Particularly advantageous embodiments of the invention are described in the dependent claims.

The infrared headlight according to the invention has an infrared emitter which is arranged in a reflector and has a radiation source which is held in an internal area of a lamp vessel. The radiation source has an associated filter body which is provided in places with a filter layer through which infrared radiation can pass but light in the visible range cannot pass. According to the invention, this filter layer is applied only to a subarea of the filter body, while all of the radiation (IR radiation and visible radiation) can pass through a part of the filter body that is not provided with a filter layer such as this. According to the invention, the uncoated part and the coated part of the filter body are designed such that all of the radiation essentially strikes a different area of the reflector than the infrared radiation which passes through the filter layer. A considerable proportion of the radiation component which is not transmitted by the filter is not absorbed, but is reflected towards the incandescent filament and is used to heat the light source, so that the efficiency of the infrared emitter is increased.

The infrared emitter according to the invention has an incandescent filament which is formed in a lamp vessel. This filament has an associated filter body, which surrounds the lamp vessel with a rotationally elliptical front part, which is provided with an interference coating and which is adjacent to a shaft without an interference coating, which transmits all of the radiation.

It has been found that the solution according to the invention makes it possible to reduce the proportion of red disturbing light to the perceptibility threshold.

According to the invention, it is particularly preferable for that part of the filter body which is provided with the filter layer to be rotationally symmetrical, preferably in the form of a rotational ellipsoid, which surrounds a lamp vessel of the infrared emitter in the area of the radiation source and which is adjacent to a shaft which is arranged at a comparatively short distance from that part of the lamp vessel which extends from the internal area of the lamp vessel towards the reflector.

In one exemplary embodiment of the invention, the radiation source is in the form of an incandescent filament which is arranged on the lamp axis and is arranged in the area between the two focal points of the filter, which is in the form of a rotational ellipsoid.

The transition between the rotationally symmetrical filter and the shaft of the filter body is located in one preferred exemplary embodiment on an intersection circle of a cone, whose tip is located in the rearward end of the incandescent filament and for whose half cone angle $20° \leq \alpha \leq 50°$, with a value of 40° being preferred.

The filter body is advantageously made of glass, with the filter layer being an infrared edge filter, preferably in the form of an interference coating.

The edge wavelength $\lambda_1$ of the filter may then, for example, be 780 to 830 nm, preferably 800 nm.

The residual light emission from the infrared emitter can be further minimized by providing different coatings for the two areas of the reflector mentioned initially, with the front area which the filtered infrared radiation strikes being designed aselectively, while the rear area which all of the radiation strikes being designed such that the radiation is reflected in a predetermined wavelength range, for example $\geq 800$ nm, and is otherwise absorbed.

In the situation where the infrared headlight is intended to be operated only in the infrared range, the front area of the reflector can be formed by colorless-anodized aluminum or glass or plastic with aluminum or silver vapor-deposited on it, while the rear part is formed by black-anodized aluminum, or glass or black plastic provided with an interference layer which reflects infrared radiation. In this case, the infrared radiation transmitted by the filter is reflected completely, while only a proportion of all of the radiation which passes through the uncoated area of the filter body above a predetermined wavelength $\lambda_3$ is reflected, with $\lambda_3$ expediently being chosen to be approximately equal to $\lambda_1$.

In the situation in which the infrared headlight is also intended to be designed with a main beam function, the reflector may be composed completely of an aselectively reflective material, or may be coated with such a material.

The main beam function can be provided particularly easily by a switching element, which is essentially opaque to radiation and, for example, is in the form of a cylindrical metal sleeve, being guided so that it can be moved or its length can be varied on the shaft, which switching element completely covers the shaft of the filter body, through which all of the radiation can pass, when acting as an infrared headlight, while exposing it as far as possible in the main beam function.

The length of the sleeve preferably corresponds at least to half the length of the shaft of the filter body along which the sleeve can be moved. This movement may be formed, for example, by a translational movement or by a combination of a translational and rotary movement.

Alternatively, it may also be possible to lengthen the sleeve telescopically, in order to cover the area of the shaft close to the filter in the infrared mode and to expose it in the main beam mode. The sleeve is preferably produced from stainless steel.

BRIEF DESCRIPTION OF THE DRAWINGS

The invention will be explained in more detail in the following text with reference to preferred exemplary embodiments. In the figures.

BEST MODE FOR CARRYING OUT THE INVENTION

Figure 1:
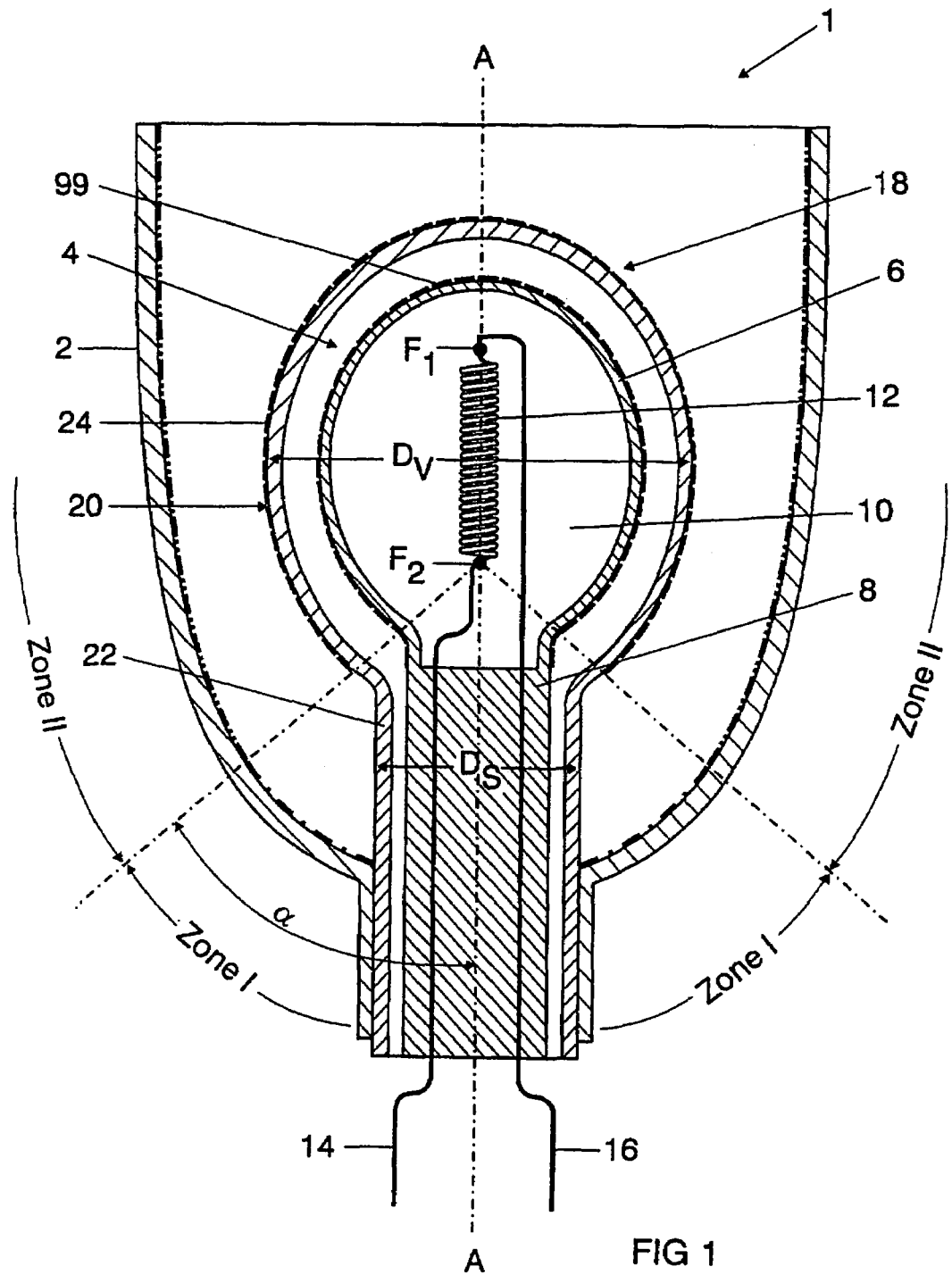
FIG. 1 shows a section illustration of an infrared headlight according to the invention.

FIG. 1 shows a schematic illustration of an infrared headlight 1 via which NIR (near infrared) radiation is emitted. Infrared headlights such as these are not only suitable for motor vehicles but can also be used in a general form for monitoring tasks or for automatic license plate identification, etc.

The infrared headlight 1 has a parabolic reflector 2 which is produced, for example, from aluminum, glass or plastic. An incandescent lamp 4 is inserted into this reflector 2 and, for example, may be in the form of a halogen incandescent lamp with a power consumption of between 50 and 100 W. All of the radiation from halogen incandescent lamps such as these contains a sufficiently large proportion of NIR radiation for use in an infrared headlight 1. The incandescent lamp 4 essentially comprises a lamp vessel 6 which is closed at one end by a pinch 8. A single incandescent filament 12, which runs on the axis A-A of the infrared headlight 1, is arranged as a radiation source in an internal area 10 of the lamp vessel 6. The electrical power is supplied to the incandescent filament 12 via two electrical power supply lines 14, 16, which are passed through the pinch 8. The lamp vessel 6 is preferably composed of quartz glass, and the internal area 10, in the case of a halogen incandescent lamp, is filled with a filling gas containing halogens. This filling is provided via a pumping vent attachment, through which the internal area 10 can be evacuated and filled. After filling, the pump vent attachment is fused together.

Up to this point, the design of the infrared headlight 1 corresponds to conventional solutions.

One special feature of the invention is that the incandescent lamp 4 is surrounded by a filter body 18 which essentially comprises a front part 20 in the form of a rotational ellipsoid and a shaft 22 adjacent to it, whose diameter $D_s$ is less than the diameter of the front part $D_v$ (view shown in FIG. 1). The two focal points of the elliptical front part 20 are identified by the reference symbols $F_1$ and $F_2$ in FIG. 1. The position of the incandescent filament 12 is chosen such that it is located in the axial direction between these two focal points $F_1$ and $F_2$. The filter body 18 is produced, for example, from quartz glass. The outer surface of the elliptical front part 20 is provided with a coating which acts as a filter. In the illustrated exemplary embodiment, this filter is formed by an interference coating 24 in the form of an infrared edge filter. An edge filter such as this transmits only radiation above a predetermined wavelength $\lambda_1$ which, in the illustrated exemplary embodiment, is chosen to be in the region of 800 nm—that is to say NIR radiation can pass through the filter. A significant proportion of the radiation at a shorter wavelength is reflected back into the interior in the direction of the incandescent filament 12, thus heating it. Depending on the application, the transparency in the short-wave range below 800 nm can be reduced further by the provision of further layers, for example absorber layers.

In one preferred embodiment, the lamp vessel 6 which surrounds the incandescent filament 12 is in the form of an ellipsoid, which is rotationally symmetrical with respect to the axis A-A and has the points F1 and F2 as focal points. In this case, the lamp vessel 6 has a coating 99 which essentially transmits only radiation at wavelengths below a predetermined wavelength $\lambda_2 > \lambda_1$. This feature is already known from so-called IRC lamps but, in contrast to them, the filter edge $\lambda_2$ is not at about 850 nm but at considerably higher wavelengths in the region of 1 100 nm. In consequence, radiation at wavelengths above 1 100 nm, for which a silicon image sensor is no longer sensitive, is reflected back to the incandescent filament 12, thus saving energy. One significant feature of the coating 99 of the lamp vessel 6 is that no absorbent elements whatsoever are used. As a consequence of this and because $\lambda_2 > \lambda_1$, the short-wave radiation which is reflected inwards on the coating 24 of the outer filter body 20 can also pass inwards through the coating 99 on the lamp vessel 6, and additionally contributes to the heating of the incandescent filament 12. The overall system comprising the outer coating 24 and the inner coating 99 thus has a bandpass response to the exterior, with a pass band $\lambda_1 < \lambda < \lambda_2$. Radiation at wavelengths outside the pass band is used in an energy-saving manner to heat the incandescent filament 12, thus resulting in increased emission within the pass band.

In another preferred embodiment, the cylindrical burner of a normal motor vehicle lamp, for example H7 or H9, with an aselectively transmitting, that is to say uncoated, lamp vessel 6 is essentially used for the incandescent lamp 4. In this case, the entire arrangement admittedly acts only as a pure edge filter, that is to say there is no recovery of the energy at wavelengths $\lambda > \lambda_2$. However, this results in a considerable design simplification, since the separation of the lamp vessel and the filter function allows the use of essentially conventionally designed motor vehicle lamps. However, the interference filter in the form of a rotational ellipsoid around the incandescent lamp avoids the disadvantages, as described initially, of separate planar filters or cylindrical filters.

According to the invention, the shaft 22 is not in the form of a filter, and all of the radiation can thus pass through it. In the described exemplary embodiment, the interference coating 24 does not extend into the area of the shaft 22. Accordingly, the filter which is formed by the front part 20 of the filter body 18 is designed to be open for all of the radiation in the rearward direction. This rearward opening, which governs the ratio between the NIR emission and all of the radiation, is, according to the invention, defined by the intersection circle of a cone with the front part 20. The tip of this cone runs—as is indicated by dashed-dotted lines in FIG. 1—through the rearward end of the incandescent filament 12, with half the cone angle $\alpha$ being defined by:

$$20° \leq \alpha \leq 50°.$$

This means that the diameter $D_s$ of the shaft 22 is defined by the intersection circle of this cone with the elliptical front part 20. This cone also subdivides the reflector 2 into two subareas, with a reflector zone (Zone I) being located in the area surrounded by the cone angle $2\alpha$, while the second zone (Zone II) of the reflector 2 is adjacent to the cone on the outside.

In the exemplary embodiment explained in FIG. 1, the inner surface of the reflector 2 is designed to be spectrally aselective in the Zone II. This area is illustrated by double dots in FIG. 1 and may be produced, for example, by colorless-anodized aluminum or from plastic or glass with aluminum or silver vapor-deposited on it. The Zone I of the reflector 2 (illustrated by single dots in FIG. 1) is designed such that it preferably reflects radiation above a predetermined wavelength $\lambda_3$, preferably in the region around 800 nm, and essentially absorbs radiation at other wavelengths.

This means that the Zone I of the reflector 2 is in the form of an infrared edge filter. By way of example, black-anodized aluminum as well as glass or black plastic which are provided with an interference layer that reflects infrared may be used as the material for this area (Zone I).

The reflector 2 surrounds the filter body 18 and the incandescent lamp, with these passing through a cap of the reflector.

Figure 2:
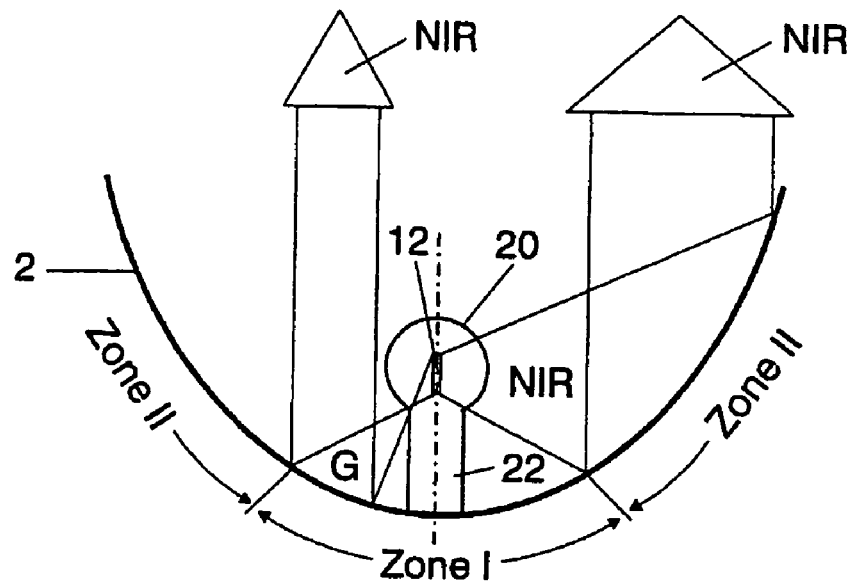
FIG. 2 shows the beam path in the exemplary embodiment shown in FIG. 1.

FIG. 2 shows, in a highly schematic form, the beam path during operation of the infrared headlight 1 as shown in FIG. 1. The configuration according to the invention of the filter body 18 with the elliptical front part 20 that acts as a filter and with the shaft 22 that is not provided with a filter layer, as well as the reflector 2 designed as described above, accordingly ensure that the NIR radiation that is transmitted by the interference coating 24 (interference edge filter) strikes only the Zone II of the reflector 2. This NIR radiation is reflected in the Zone II, and emerges from the reflector opening. This beam path is indicated on the right in FIG. 2. All of the radiation can strike the reflector 2 only in the area which is identified by the cone angle $2\alpha$ and by the Zone I. Since this Zone I is in the form of an infrared edge filter, only the NIR component of the radiation is reflected (on the left in FIG. 2), while the radiation in the wavelength range below this is essentially absorbed. The NIR radiation component that is reflected by the reflector 2 in the Zone I emerges together with the NIR radiation from the Zone II through the reflector opening.

In contrast to an infrared headlight with a planar filter fitted to a reflector opening, the described design can be produced with virtually any desired aperture and, in particular, also in the form of a broad-beam headlight. Virtually any desired electrical powers are possible while retaining the fundamental geometrical proportions. The advantage over the known solution with a cylindrical filter placed over it is essentially that considerably smaller incidence angles strike the elliptical filter contour (front part 20), thus resulting in a considerable reduction in the red residual light while at the same time increasing the non-transmitted proportion of the radiation which is reflected back onto the incandescent filament 12.

The design illustrated in FIG. 1 also ensures that the radiation coming from the incandescent filament 12 passes only through an infrared filter, that is to say the filtering is carried out either by the interference coating 24 or in the Zone I. If, in contrast to this, the entire reflector surface were to be designed to be infrared-selective with the material used in the Zone I, this would result, in consequence of the multiplication of the spectral transmission degrees, not only in less transmission overall but also in a far flatter filter edge in the region of 800 nm.

However, a filter edge that is as steep as possible is a major advantage since the sensitivity of silicon receiving sensors in the cameras that are preferably used in conjunction with the infrared headlights according to the invention with night-vision systems falls off very sharply in the region of 800 to 1 000 nm while, on the other hand, the emission in the long-wave visible range should be as little as possible.

Figure 3:
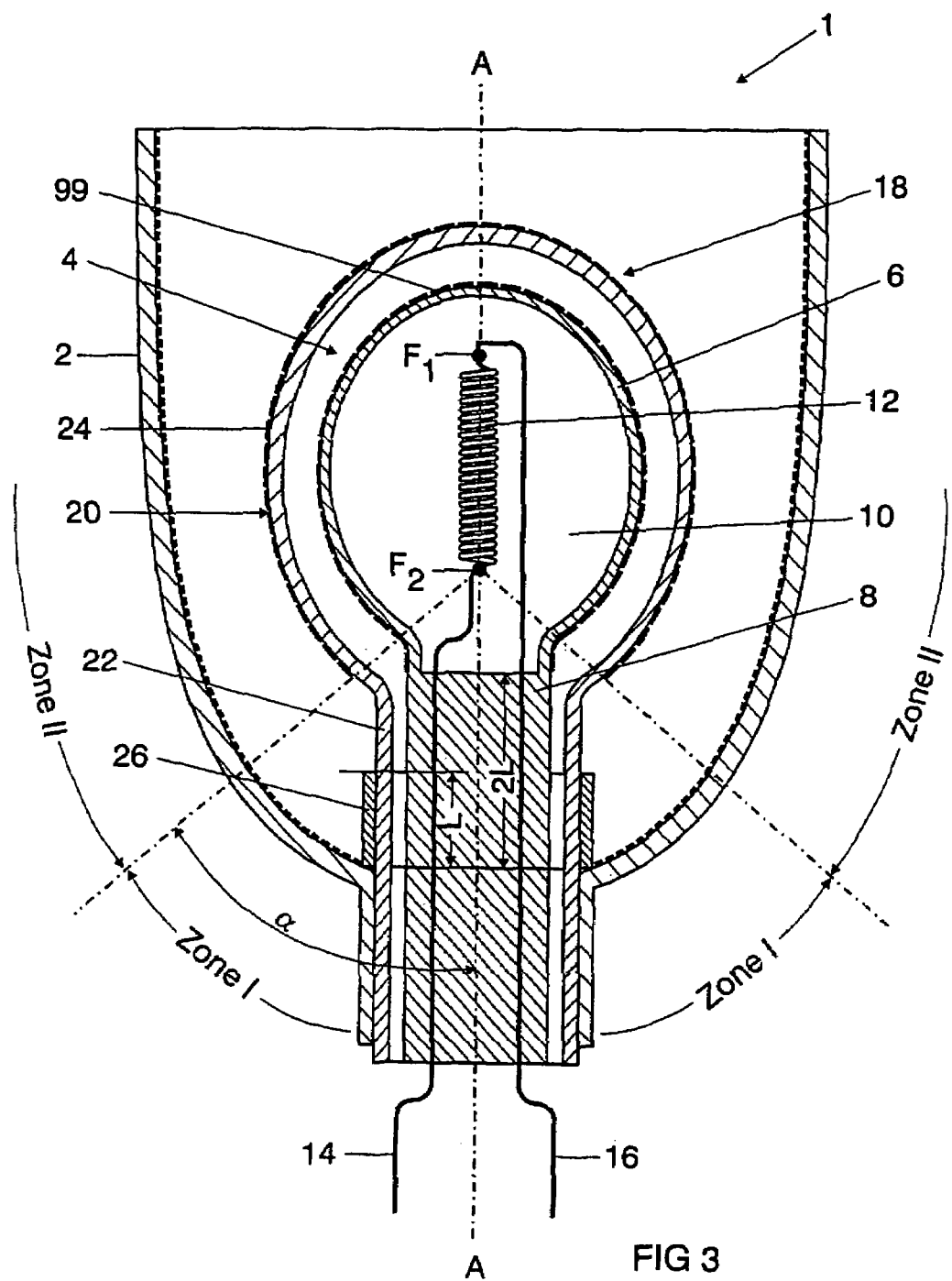
FIG. 3 shows a section illustration of an infrared headlight with a main beam function.

FIG. 3 shows an exemplary embodiment in which the infrared headlight 1 has a main beam function. Use as a main beam headlight for motor vehicles will be described, by way of example, in the following text. The fundamental design of the infrared headlight 1 is the same as in the exemplary embodiment described above, that is to say an incandescent lamp 4, preferably a halogen incandescent lamp, is inserted into a reflector 2 whose shape comprises a parabolic contour that is produced by rotation about an axis of symmetry, or mirror-imaging on two planes of symmetry. The incandescent lamp 4 is surrounded by the filter body 18, whose front part 20 is provided with an interference coating 24. The front part 20 is in the form of a rotational ellipsoid with the focal points F1, F2. The front part 20 is adjacent to an approximately cylindrical shaft 22, through which essentially all of the radiation that is emitted from the incandescent filament 12 can pass.

In the exemplary embodiment shown in FIG. 3, a switching cylinder 26 is guided such that it can be moved axially via a device that is not illustrated on the approximately cylindrical shaft 22. This switching cylinder 26 is essentially opaque to all of the radiation and is formed, for example, from stainless steel. The axial length L of the switching cylinder 26 is preferably at least half the overall length 2L of the shaft 22. The internal diameter of the switching cylinder 26 is designed to be somewhat larger than the external extent of the shaft 22, so that it can be moved in a sliding form, without significant friction.

A further difference from the exemplary embodiment described initially is that, in the case of the combined main beam and infrared headlight illustrated in FIG. 3, both the Zone I and the Zone II are composed of the same, aselectively reflective material, or are coated with such a material.

Figure 4:
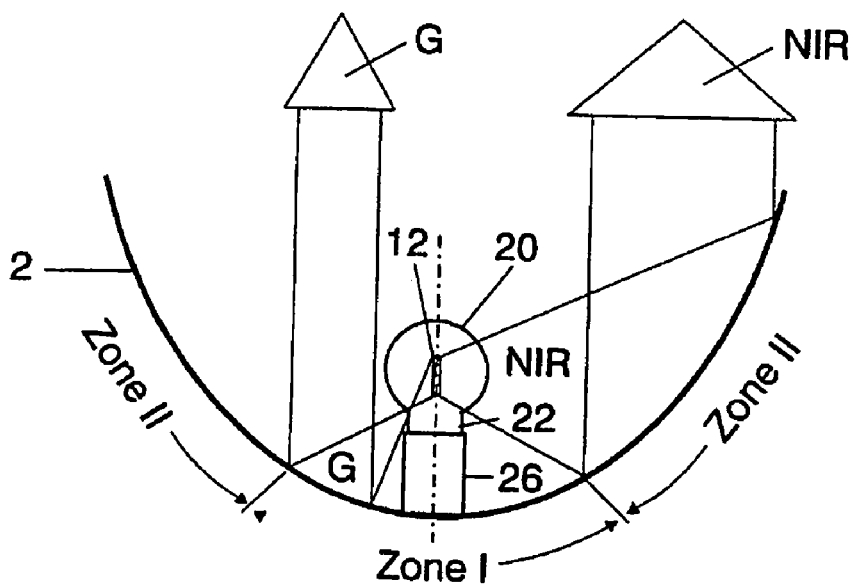
FIG. 4 shows the beam path in the exemplary embodiment shown in FIG. 3.

When being used as a main beam headlight, the main beam is revealed, and the switching cylinder 26 is located in its rear position, as illustrated in FIG. 3, in which it is moved towards the reflector 2. The resultant beam path is illustrated in FIG. 4. As in the case of the exemplary embodiment described above, the NIR radiation that is transmitted by the interference coating 24 strikes the Zone II of the reflector 2, and is reflected by it towards the reflector opening. All of the radiation can pass through that area of the shaft 22 that is not covered by the switching cylinder 26 and strikes the Zone I, where it is reflected as total radiation and acts as a main beam in the visible range.

Thus, in contrast to the solution proposed in DE 39 32 216 A1, the headlight according to the invention emits main beam light and NIR radiation at the same time, rather than alternately, and can thus be designed for very considerably greater emitted radiation intensities, overall. The increase in the range in the main beam mode that is made possible in this way may, however, be exploited to the full extent only if the camera for the night-vision system (not illustrated) can record with high sensitivity not only the NIR range but also the entire range of the visible radiation, that is to say the total wavelength range from 380 to 1 100 nm. A further advantage is that, for example, the residual daylight after sunset, the light from external lighting systems with fluorescent lamps, sodium low-pressure lamps, mercury and sodium high-pressure lamps, illuminated traffic signs as well as traffic lights and vehicle lights with LEDs can also be used for image production. In contrast, a night-vision system based purely on infrared is blind for the radiation sources mentioned above.

In order to change from main beam to essentially pure NIR radiation, the switching cylinder 26 is moved from the position illustrated in FIG. 3 forwards towards the front part 20. In the process, the front edge of the switching cylinder 26 virtually rests on the external circumference of the elliptical front part 20.

When the switching cylinder 26 is in the front position, virtually none of the total radiation strikes the Zone I of the reflector 2, so that only the NIR radiation that is transmitted by the interference coating is emitted via the Zone II of the reflector 2. This NIR radiation does not dazzle other road users, but the vehicle driver can use the night-vision system to identify things happening on the roadway well beyond the limit of the conventional dipped beam, which is produced by a separate headlight. Only a negligible amount of stray light emerges from the rear part of the shaft (between the switching cylinder 26 and the reflector).

In the exemplary embodiment described above, the switching cylinder 26 is in the form of a rigid sleeve. In principle, it may also be telescopic, so that the front part of the shaft 22 can be exposed for the main beam function while, in the dipped-beam function, the switching cylinder 26 is lengthened forwards in the axial direction, so that the rear half of the shaft 22 is always surrounded in a radiation-tight form, thus resulting in particularly far-reaching dimming.

In contrast to a normal main beam, the infrared headlight 1 according to the invention can not only be switched on and off, but it is also possible to choose between total radiation plus NIR radiation (on the left and right in FIG. 4) and pure NIR radiation (on the right in FIG. 4) by movement of the switching cylinder 26. These operating modes are summarized in Table 1.

In the basic mode of the infrared headlight 1, the incandescent filament 12 is switched off, and the switching cylinder 26 is located in its rear position (FIGS. 3, 4)—the headlight is not in operation [0].

TABLE 1

| Mode | Electrical | Cylinder (26) | Application |
|---|---|---|---|
| [0] Not operating | OFF | Rear | Basic mode |
| [1] Readiness | OFF | Front | Readiness for operating mode [2] with dipped beam selected |
| [2] NIR emitter | ON | Front | Automatic switch on as a function of the driving situation |
| [3] Total emitter | ON | Rear | Use as a conventional main beam or for headlight flashing |

When the separate dipped-beam headlight is switched on, then the infrared headlight 1 is switched to a readiness state, by moving the switching cylinder 26 to its front position. The electrical power supply to the incandescent filament 12 is still switched off. This mode is referred to as [1] in the table.

It is possible to switch automatically from this readiness mode [1] to the mode as an NIR emitter ([2] in the table) as a function of the driving situation. This situation can be detected by a speed threshold, or else by evaluation of the frequency of speed changes or steering movements in order that, for example, when driving in a stream of traffic or when driving slowly within a city, other road users are not disturbed by unnecessarily high NIR radiation. In addition, a smooth transition, in particular between the modes [1] and [2] is worthwhile by using the speed of travel and/or other criteria to graduate the NIR radiation that is produced by an appropriate electrical power supply (dimming) to the incandescent filament 12.

Switching from the mode [2] to [3] corresponds to conventional main beam operation, with the switching cylinder 26 being moved electromechanically to the rear, and the incandescent filament 12 being operated at full power.

Manual switching between the basic mode [0] to [3] is carried out only by switching on the burner with full power, and corresponds to conventional headlight flashing.

When used as a motor vehicle main beam headlight, the incandescent lamp 4 is selected such that the headlight in the undipped state [3] together with the separately required dipped-beam headlight satisfies the minimum requirements for a motor vehicle main beam. A conventional incandescent lamp 4 with a power consumption of 50 to 100 watts is suitable for this purpose. In the case of pure NIR emission, that is to say in the mode [2] as shown in Table 1, the residual light from the headlight 1 together with the dipped-beam headlight that is also still required should satisfy the requirements for a dipped-beam.

Since the residual amount of light in the concept according to the invention varies in the region of 1 lumen, this requirement can be complied with without any problems.

The axial movement of the switching cylinder 26 may be purely translational or may be carried out by superimposition of translation and rotation by means of a suitable drive, with this drive being designed such that the movement is very fast, so that there is no delay during switching. The fact that the front position has been reached must be checked by means of a limit switch or the like (not illustrated). Specifically, when the intention is to switch to the operating mode [2], but the switching cylinder has not moved completely to the front limit position as a result of a defect, the main beam still emerges completely or partially, so that the vehicle would no longer have a dipped beam in compliance with the standards as a result of the described design of the incandescent lamp 4, and other road users could be dazzled.

Thus, if the limit switch does not respond in the event of a fault when changing to the operating mode [1] or [2], the electrical power supply to the incandescent lamp 4 must be turned off, although it should still be possible to use operating mode [3].

Particularly preferred dimensions for the components described above are described in Table 2.

One particular advantage of the design according to the invention is that the rigid arrangement of the filter body 18 with the coated front part 20 with respect to the radiation source (incandescent filament 12) means that the incandescent lamp 4 is always operated in uniform thermal ambient conditions, for which it can be optimized. In the case of the exemplary embodiment shown in FIG. 3, only the switching cylinder 26 can move, but it can be adjusted very easily and its movement or length change can be produced by a mechanism of simple design.

TABLE 2

| Component | Dimension | Value range |
|---|---|---|
| Reflector (2) | Diameter | 75-200 mm |
| Zone I | Edge wavelength $\lambda_3$ | 780-830 nm (800 nm) or aselective |
| Zone II | Spectral reflection | always aselective |
| Incandescent lamp (4) | Power | 50-100 W |
| | Distribution temperature | $\geq$ 2 900 K (3 200 K) |
| Filament (12) | Length | 3-6 mm |
| Filter body (18) | Overall length | 40-60 mm |
| | Angle $\alpha$ | 20-50° (40°) |
| | Material | Quartz glass |
| Front part (20) | Length | 20-40 mm |
| | Diameter $D_v$ | 15-30 mm |
| Shaft (22) | Length (2 L) | 20-30 mm |
| | Diameter $D_s$ | 12-20 mm |
| Interference layer (24) | Edge wavelength $\lambda_1$ | 780-830 nm (800 nm) |
| | Material | $SiO_2$, $TiO_2$, $Fe_2O_3$, $Nb_2O_5$ |
| Interference layer (99) | Edge wavelength $\lambda_2$ | 1050-1150 nm (1100 nm) |
| | Material | SI, $SiO_2$, $TiO_2$, $Nb_2O_5$ |
| Switching cylinder (26) | Length (L) | 10-15 mm |
| | Internal diameter | $>D_s$ |
| | Material | e.g. stainless steel |

What is claimed is:

1. An infrared headlight comprising:
   an infrared emitter which is arranged in a reflector and has a radiation source which is held in an internal area of a lamp vessel, and the headlight having
   a filter which is permeable for radiation in the infrared range and reflects radiation at another wavelength, having
   a filter body which surrounds the lamp vessel at least in places, wherein the filter body has a part which is provided with a filter layer and a part which is not provided with a filter layer, which parts are designed such that all of the radiation transmitted through the part provided with the filter layer strikes a first area of the reflector formed with a first material having a reflective characteristic or does not strike the reflector, and all of the radiation through the part not provided by the filter layer strikes a second area of the reflector formed from a second material having a second reflective characteristic different from the first reflective characteristic.

2. The infrared headlight as claimed in claim 1, wherein that part of the filter body which is provided with the filter layer is in the form of a rotationally symmetrical front part, which surrounds the lamp vessel in the area of the radiation source and which is adjacent to but offset from a shaft, which extends as part of the lamp vessel from the internal area of the lamp vessel towards the reflector.

3. The infrared headlight as claimed in claim 2, wherein the front part is approximately in the form of a rotational ellipsoid, and the shaft is cylindrical.

4. The infrared headlight as claimed in claim 3, wherein the radiation source is an incandescent filament which is arranged on the lamp axis and is arranged in the area between the two focal points of the rotationally elliptical front part.

5. The infrared headlight as claimed in claim 4, wherein the shaft and the front part meet along an intersection circle of a cone with the front part, whose tip is located in the rearward end of the incandescent filament and whose half cone angle ($\alpha$) is between ($20° \leq \alpha \leq 50°$).

6. The infrared headlight as claimed in claim 1, wherein the filter body is formed from quartz glass, and the filter layer is an infrared (IR) edge filter.

7. The infrared headlight as claimed in claim 1, wherein the filter layer is an edge filter with an edge wavelength $\lambda_1$ at approximately 780 nm to 830 nm.

8. The infrared headlight as claimed in claim 1, having a main beam function, wherein the reflector is composed completely of an aselectively reflective material, or is coated with such a material.

9. The infrared headlight as claimed in claim 1, wherein the filter body and the infrared emitter are surrounded by the reflector.

10. The infrared headlight as claimed in claim 1 further comprising a night-vision system having a camera, which has a uniform radiation sensitivity in the wavelength range from 380 nm to 1100 nm.

11. An infrared headlight comprising:
    an infrared emitter which is arranged in a reflector and has a radiation source which is held in an internal area of a lamp vessel, and the headlight having
    a filter which is permeable for radiation in the infrared range and reflects radiation at another wavelength, and having
    a filter body which surrounds the lamp vessel at least in places, wherein the filter body has a part which is provided with a filter layer and a part which is not provided with a filter layer, which parts are designed such that all of the radiation transmitted through the part provided with the filter layer strikes a first area of the reflector or does not strike the reflector, and all of the radiation through the part not provided by the filter layer strikes a second area of the reflector, wherein the first area of the reflector and the second area of the reflector are produced from different materials or are coated differently, wherein the first area is a front area, which the filtered radiation strikes, and is designed to be aselective, while the second area is a rear area which all of the radiation strikes is designed such that the radiation above a predetermined wavelength $\lambda_3$ is reflected, and is otherwise absorbed.

12. The infrared headlight as claimed in claim 11, wherein the front area is formed by colorless-anodized aluminum or by aluminum, plastic or glass with silver vapor-deposited on it, and the rear area is formed by black-anodized aluminum, or by glass or black plastic provided with an interference layer which reflects the infrared radiation.

13. An infrared headlight comprising:
an infrared emitter which is arranged in a reflector and has a radiation source which is held in an internal area of a lamp vessel, and the headlight having
a filter which is permeable for radiation in the infrared range and reflects radiation at another wavelength, having
a filter body which surrounds the lamp vessel at least in places, wherein the filter body has a part which is provided with a filter layer and a part which is not provided with a filter layer, which parts are designed such that all of the radiation transmitted through the part provided with the filter layer strikes a first area of the reflector or does not strike the reflector, and all of the radiation through the part not provided by the filter layer strikes a second area of the reflector;
wherein that part of the filter body which is provided with the filter layer is in the form of a rotationally symmetrical front part, which surrounds the lamp vessel in the area of the radiation source and which is adjacent to but offset from a shaft, which extends as part of the lamp vessel from the internal area of the lamp vessel towards the reflector;
wherein the front part is approximately in the form of a rotational ellipsoid, and the shaft is cylindrical; and
wherein a switching cylinder is guided such that the switching cylinder is movable along the shaft, the casing of which switching cylinder is substantially opaque to radiation and which is slidingly movable towards the front part when being operated as an infrared headlight and is slidingly movable towards the reflector when being operated other than as an infrared headlight.

14. The infrared headlight as claimed in claim 13, wherein the length (L) of the switching cylinder corresponds approximately to half the length of the shaft.

15. The infrared headlight as claimed in claim 13, wherein the movement is provided by means of a drive for the switching cylinder, translationally or by superimposition of a rotation and translation movement.

16. The infrared headlight as claimed in claim 13, wherein the switching cylinder is telescopically lengthenable.

17. The infrared headlight as claimed in claim 13, wherein the switching cylinder is produced from stainless steel.

18. The infrared headlight as claimed in claim 13, in which a limit switch is closed in the front position of the switching cylinder.

19. The infrared headlight as claimed in claim 18, in which, in the front position of the switching cylinder, the incandescent lamp is supplied with electrical power only when the limit switch is closed.

20. An infrared headlamp comprising:
a light transmissive lamp body having a wall defining an enclosed cavity, and having a seal portion extending axially way from enclosed cavity;
a light source emitting visible light and infrared light enclosed in the defined lamp body cavity;
a lamp coating formed on a portion of the lamp body and not formed on the seal portion, the lamp coating substantially reflecting light with a wavelength greater than a fixed value $\lambda_2$ and substantially transmitting light with a wavelength less than the fixed value $\lambda_2$;
a filter body having a wall defining an enclosed volume, the lamp body being enclosed in the filter body;
a filter coating formed on the filter body, the filter coating substantially reflecting light with a wavelength less than a fixed value $\lambda_1$ and substantially transmitting light with a wavelength greater than the fixed value $\lambda_1$;
a reflector having a wall defining an interior volume, the lamp body and filter body assembly being located in the interior volume of the reflector;
the reflector having an interior surface facing the lamp body and filter body assembly;
the interior surface of the reflector having a first reflective area receiving light emitted by the light source through the lamp coating and through the filter coating, and reflecting such received light to a field to be illuminated;
the interior surface of the reflector having a second reflective area receiving light emitted by the light source and not transmitted through the lamp coating and not transmitted through the filter coating, and reflecting such received light to the field to be illuminated; and
further including a switching cylinder comprising a light shade shiftably mounted adjacent said seal portion between a first position and a second position so as to intercept a substantial portion of light emitted by the light source and not transmitted through the filter coating when in the first position, and not intercept a substantial portion of the light emitted by the light source and not transmitted through the filter coating when in the second position.

* * * * *